(12) United States Patent
Liu

(10) Patent No.: US 7,353,204 B2
(45) Date of Patent: Apr. 1, 2008

(54) CERTIFIED TRANSMISSION SYSTEM

(75) Inventor: Gary Liu, Plano, TX (US)

(73) Assignee: Zix Corporation, Dallas, TX (US)

( * ) Notice: Subject to any disclaimer, the term of this patent is extended or adjusted under 35 U.S.C. 154(b) by 583 days.

(21) Appl. No.: 09/826,320

(22) Filed: Apr. 3, 2001

(65) Prior Publication Data

US 2002/0143710 A1 Oct. 3, 2002

(51) Int. Cl.
*G06Q 99/00* (2006.01)

(52) U.S. Cl. ............................. 705/50; 705/51; 705/75

(58) Field of Classification Search ................ 713/170, 713/155, 168, 200; 380/259, 28, 282, 286; 705/67, 64, 51, 75, 50
See application file for complete search history.

(56) References Cited

U.S. PATENT DOCUMENTS

RE38,070 E * 4/2003 Spies et al. ................. 380/277
6,549,626 B1 * 4/2003 Al-Salqan ................... 380/286
6,571,334 B1 * 5/2003 Feldbau et al. ............. 713/170

FOREIGN PATENT DOCUMENTS

JP        02000050331 A  *  2/2000

* cited by examiner

*Primary Examiner*—Pierre Eddy Elisca
(74) *Attorney, Agent, or Firm*—Fish & Richardson P.C.

(57) ABSTRACT

The invention provides a method and apparatus for transmitting a message from a sender to an intended recipient. The method includes encrypting a message using a symmetric key, sending the encrypted message to an intended recipient without the symmetric key and providing the symmetric key to a third party. If the intended recipient signs and returns to the third party a receipt for the message, the method includes transferring, by the third party, the receipt to the sender and providing the symmetric key to the intended recipient.

44 Claims, 5 Drawing Sheets

CERTIFIED TRANSMISSION SYSTEM

FIELD OF THE INVENTION

The invention relates generally to communication systems and to a method and system for providing irrefutable proof of a transmission between network users.

BACKGROUND OF THE INVENTION

Data transmissions using the Internet are becoming increasingly useful in conducting business-to-business (B2B) and business-to-consumer/customer (B2C) transactions. Payment systems and messaging systems are widely used to transfer data across the Internet. Often, the senders of such data desire to receive confirmation of receipt of data returned from the intended recipients. For example, conventional email systems can support a return receipt feature. In a conventional email system, a return receipt indicates that "a user" has received the intended message. However, the return receipt does not guarantee that the intended recipient has received the intended message, because anyone, including the sender, can easily forge such a receipt. In addition, there are usually many ways for the recipient to read the message without sending the receipt. What is desired is a system that allows the sender to obtain an irrefutable proof that the recipient has received a particular message/data. In addition, the system should prevent the sender from obtaining such proof unless the message/data has actually been delivered to the recipient. In many situations, it may also be desirable to have an irrefutable proof that the message/data was sent and received at specific times.

SUMMARY OF THE INVENTION

In one aspect, the invention provides a method for transmitting a message from a sender to an intended recipient. The method includes encrypting a message using a symmetric key, sending the encrypted message to an intended recipient without the symmetric key and providing the symmetric key to a third party. If the intended recipient signs and returns to the third party a receipt for the message, the method includes transferring, by the third party, the receipt to the sender and providing the symmetric key to the intended recipient.

Aspects of the invention can include one or more of the following features. The receipt signed by the recipient can include an identifier computed from the message and the symmetric key using cryptographically secure hash functions.

In another aspect, the invention provides a method for transmitting a message from a sender to an intended recipient. The method includes, at the sender, encrypting a message using a symmetric key, encrypting the symmetric key to make the symmetric key accessible to a third party but not to a recipient and sending the encrypted message and the encrypted symmetric key to an intended recipient. At the recipient, the method includes signing a receipt for the message and sending the receipt and the encrypted symmetric key to the third party. At the third party, the method includes transferring the receipt to the sender and providing the symmetric key to the intended recipient if the receipt is properly signed.

In another aspect, the invention provides a method for certifying receipt of a message. The message is sent from a sender to an intended recipient and is encrypted by a symmetric key where the symmetric key is encrypted to be only accessible to the third party. The method executes at a third party distinct from the sender and the recipient and includes receiving a signed receipt and the encrypted symmetric key from an intended recipient. The signed receipt memorializes receipt of the encrypted message by the intended recipient. The method includes verifying the signed receipt, transferring the verified receipt to the sender and providing the symmetric key to the intended recipient.

In another aspect, the invention provides a method for certifying receipt of a message. The message is sent from a sender to an intended recipient and is encrypted by a symmetric key. The message includes a separately encrypted message header including the symmetric key and a message identifier associated with the message. The method executes at a third party distinct from the sender and the recipient and includes receiving a separately encrypted message header and a certified receipt originating from the intended recipient. The certified receipt includes the message identifier signed by the recipient. The method includes decrypting the separately encrypted message header to expose the symmetric key and the message identifier, verifying the certified receipt including verifying the signature of the intended recipient and the message identifier in the certified receipt is the same as the message identifier obtained from the separately encrypted message header, forwarding the certified receipt to the sender and forwarding the symmetric key to the intended recipient.

In another aspect, the invention provides a method for transmitting a message from a sender to an intended recipient and includes encrypting a message using a symmetric key, storing the symmetric key and the message, sending the encrypted message to an intended recipient without the symmetric key, forwarding the encrypted symmetric key to a third party, receiving from the third party a certified receipt verified by the third party indicating receipt of the message by the intended recipient and verifying the validity of the certified receipt using the stored symmetric key and the certified message.

In another aspect, the invention provides a method for transmitting a message from a sender to an intended recipient and includes identifying a message for transmission to an intended recipient, creating a message header that includes a symmetric key and a message identifier associated with the message, encrypting the message using the symmetric key, public key encrypting the message header using a public key of a third party, attaching the message header to the encrypted message forming a certified message and forwarding the certified message to the intended recipient, storing a copy of the certified message and the symmetric key and receiving a certified receipt originating from the intended recipient. The certified receipt is verified at the third party and forwarded to the sender after verification. The method includes verifying the validity of the receipt using the stored symmetric key and the certified message.

In another aspect, the invention provides a method for providing a receipt for a message where the message is sent from a sender to an intended recipient and the method executes at the recipient. The method includes receiving an encrypted message from the sender, the message encrypted by a symmetric key and creating a receipt for the encrypted message including signing a hash of the encrypted message and returning the signed receipt to a third party. After verification of the signed receipt at the third party, the method includes receiving the symmetric key from the third party so that the intended recipient can decrypt the encrypted message.

Aspects of the invention can include one or more of the following features. The step of receiving the symmetric key can include not receiving the symmetric key until the signed receipt is delivered to the sender.

Implementations of the invention can include one or more of the following advantages.

A system is provided that allows the sender of a secure message or data to obtain a certified receipt from the recipient as an irrefutable proof that the message/data has been delivered. The system prevents the recipient from obtaining the message/data, unless a valid certified receipt is signed and sent back to the sender. In addition, the system prevents the sender from forging or otherwise tricking the recipients into providing the certified receipt without actually allowing the recipient to obtain the message or data. In several refined implementations, the system will provide additional security features, including certified time stamps that can be used to prove that the message or data was sent and received at specific times.

These and other advantages of the present invention will become apparent from the following description and from the claims.

DETAILED DESCRIPTION OF THE PREFERRED EMBODIMENT

Figure 1:
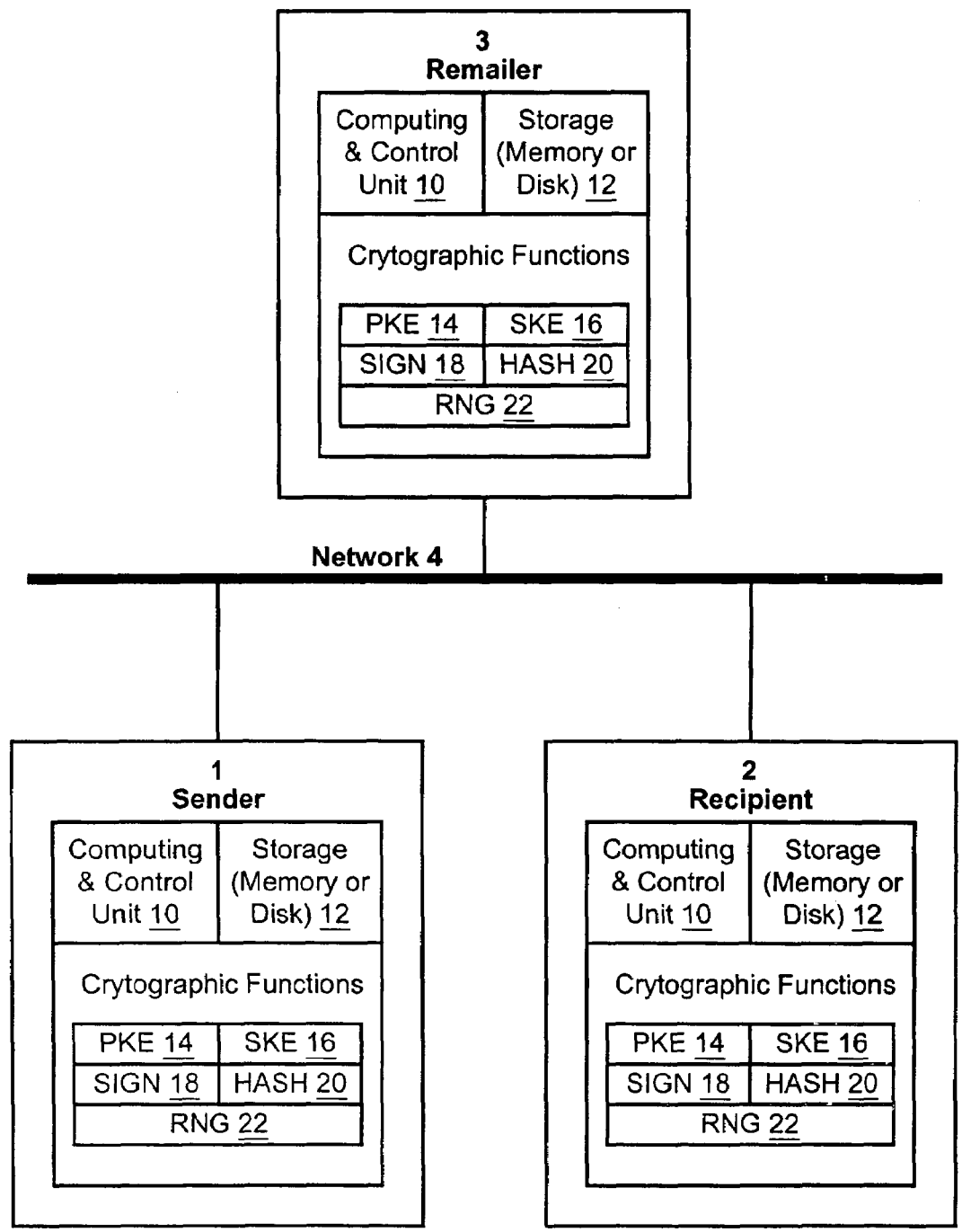
FIG. 1 is a schematic block diagram of a system that provides the basic security features for certified communications.

The present invention provides a communication system for securely and easily generating, sending, and verifying the authenticity of messages or data sent to a recipient over a network. In addition, the system provides irrefutable proof that the recipient received a particular message/data.

A number of terms are used herein to describe network transmissions and related structures and processes.

"Network" refers to a private or public network. Private networks include an intranet, that is, a network connecting one or more private servers such as a local area network (LAN). Alternatively, the network can be a public network, such as the Internet, in which data is passed over untrusted communication links. The network configuration can include a combination of public and private networks. For example, two or more LAN's can be coupled together with individual terminals using a public network such as the Internet.

"Internet" refers to all of the networks that use the TCP/IP suite, which cooperate to form a seamless network for their collective users. The invention has particular applicability to communications on the Internet between clients. However, other communications over other networks can also benefit from the secure transmission features disclosed herein.

"Encryption" refers to a process of encoding a document or data in order to hide its content from anyone except an intended recipient. "Decryption" refers to the reciprocal process, by a recipient, of recovering the original data. Two encryption methods are used and described in greater detail below: symmetric key encryption and public key encryption.

"Symmetric key encryption" refers to an encryption method in which the encipher key and the decipher key are the same. In one implementation, AES, DES or Triple DES encryption is used for symmetric key encryption. The phrases "encrypted by a session key" and "decrypted by a session key" refer to steps implemented when using symmetric key encryption. SKE(symmetricKey, Data) is the notation used herein to denote symmetric key encryption (i.e., the Data is encrypted by the symmetricKey using a symmetric key encryption algorithm, such as Triple-DES).

"Public key encryption" refers to an encryption method in which the encipher key and decipher key are different. The encipher key can be made public to alleviate difficulty of a symmetric key exchange between the sender and recipient. In a common hybrid implementation, data can be symmetrically encrypted using a random symmetric key, and then the random symmetric key can be encrypted using a public key and an asymmetric key encryption algorithm. In one implementation, a variation of the Rabin public key encryption algorithm is used to encrypt a randomly generated symmetric key, and then the symmetric key is used to encrypt a given message using AES, DES or Triple DES encryption. The phrases "encrypted by the (recipient's) public key" and "decrypted using the (recipient's) private key" refer to steps implemented when using public key encryption. PKE(publicKey, Data) is the notation used herein to denote public key encryption (i.e., the Data is encrypted by the publicKey). If the data to be encrypted is small enough, the data can be directly encrypted by the public key without using a public key/symmetric key hybrid.

"Hash" or "Hashing", denoted by HASH (Data), refers to a process of applying a one-way hash function to the Data. An example of one-way hash function includes a message digest five (MD5) hash function.

"Signature" refers to a designator that is attached to a document that can be verified to authenticate the originator and the integrity of the document. "Signing" or "signed" or "sign" refer to a specific operation that is applied to a document, message or string to produce a verifiable form of a signature. "Signature Verification" is the reciprocal process for validating the signature produced by the signing process. SIGNED(privateKey, Data) is the notation used herein to denote the result of a signing process (i.e., denotes the Data is signed by the privateKey). The Signature can be computed using an asymmetric key digital signature algorithm (such as Rabin public key digital signature algorithm). One conventional way of signing Data is to first compute the hash of Data, then compute the signature from the hash using the asymmetric key algorithm, and finally append the signature to Data. In this case, SIGNED(privateKey, Data) will include the Data itself and the signature attached. Alternatively, if the Data is small enough, the signature may be directly computed from the Data instead of the hash of the Data. In this case, SIGNED(privateKey, Data) can contain only the signature.

Plus sign "+" is used to indicate that several items are packed into one data package. For example, SIGNED(privateKey, Data1+Data2+Data3) indicates that Data1, Data2, Data3 are first packed into one data package and then the package is signed using the privateKey.

A "Time Stamp Certificate" or "TSC," as used herein, refers to a certificate signed by a central server (Time Stamp Certificate Server or TSC Server) to certify the time of the message and the public keys of the sender and the recipient.

The time stamp certificate can be used to certify the sender, the recipient, the time the message was sent, the public key of the sender, and the public key of the recipient. A TSC can be of the form of SIGNED(TSCServerPrivateKey, Time+MessageID+SenderInfo+RecipientInfo+RootCertificate) using the notations defined above. In this notation, Time is the time of the message. MessageID is a quantity irrefutably tied to the message. It can be the hash of the message or parts of the message, or the hash of some other quantities plus the message. The SenderInfo can include the sender's public key or the hash of the public key, and sender's email address or the hash of the email address. RecipientInfo can include the recipient's public key or the hash of the public key, and email address or the hash of email address. If a message is to be sent to several recipients, the TSC may include multiple RecipientInfo. The TSC is signed by the Time Stamp Certificate Server using TSCServerPrivateKey. The public key of the Time Stamp Certificate Server can be certified by use of a root certificate (RootCertificate). An example of a Time Stamp Certificate Server and the process for issuing a time stamp certificate are described in greater detail as part of the Signature Server described in co-pending and commonly owned application entitled "Secure Transmission System", filed Jun. 28, 1999, and assigned Ser. No. 09/340,853, the contents of which are expressly incorporated herein by reference.

"Valid certified receipt", as used herein, refers to a certified receipt that is signed by the recipient, and therefore, provides an irrefutable proof that the recipient has received a certain message. A valid certified receipt contains a "Message ID" which can be irrefutably verified against the certified mail the recipient receives or a carbon copy the sender keeps.

Referring now to FIG. 1, a system for facilitating certified communications between two computing devices (e.g., a "Sender" 1 and a "Recipient" 2) over a network 4 is shown. A Remailer 3 is also coupled to the network 4 and can be accessed by each recipient 2. The present invention will be described in terms of a generic messaging system. However, those of ordinary skill in the art will recognize that the principles disclosed herein are applicable to many forms of messaging systems including E-mail and electronic transaction and payment systems.

The Sender 1, the Recipient 2, and the Remailer 3 are all computing devices capable of cryptographic computations. Each includes a computing/control unit 10, a storage (memory) 12, and a set of cryptographic functions (i.e., PKE engine 14, SKE engine 16, signature engine (sign) 18, hash engine 20 and random number generator 22). In one implementation, each computing device is a general-purpose computer, in which the computing/control unit 10 is one or more CPUs, and the storage 12 is one or more RAM chips or disks. In an alternative implementation, the computing devices can be special devices, in which all the functional units are implemented using one or more FPGAs, ASICs, and other type of integrated circuits. The cryptographic functions include engines to handle computations associated with PKE, SKE, SIGNED, and HASH functions defined above. PKE engine 14 is used to compute PKE(PublicKey, Data), or reverse the process to recover Data from PKE (PublicKey, Data) using the corresponding private key. SKE engine 16 is used to compute SKE(SymmetricKey, Data), or reverse the process to recover the Data using the same SymmetricKey. The signature engine 18 is used to compute SIGNED(PrivateKey, Data), or verify a signature using the corresponding public key. The hash engine 20 is used to compute HASH(Data). The cryptographic functions also include a secure random number generator (RNG 22). The random number generator (RNG 22) is used to generate random symmetric keys to be used in the symmetric key and public key encryption processes. In one implementation, the hash engine 20 uses a MD5 algorithm, the SKE engine 16 uses a Triple-DES algorithm, the PKE engine 14 uses a 1024-bit Rabin public key encryption algorithm to encrypt a random Triple-DES key and then uses the Triple-DES key to encrypt the data, the signature engine 18 uses a 1024-bit Rabin public key digital signature algorithm, and the RNG 22 uses random user input events (e.g. mouse movements, key board hits, etc.) to generate random numbers. Not all the cryptographic functions are needed by all three parties (the Sender 1, the Recipient 2, and the Remailer 3). Which function is needed by which party will be clear when the certified communication processes are discussed below in association with FIGS. 2 and 4*a-b*.

Network 4 can be any type of communication link between the Sender 1, the Recipient 2 and the Remailer 3. In one implementation, Network 4 is the Internet. Network 4 can also be an intranet or a combination of public and private networks.

The Basic Process

Figure 2:
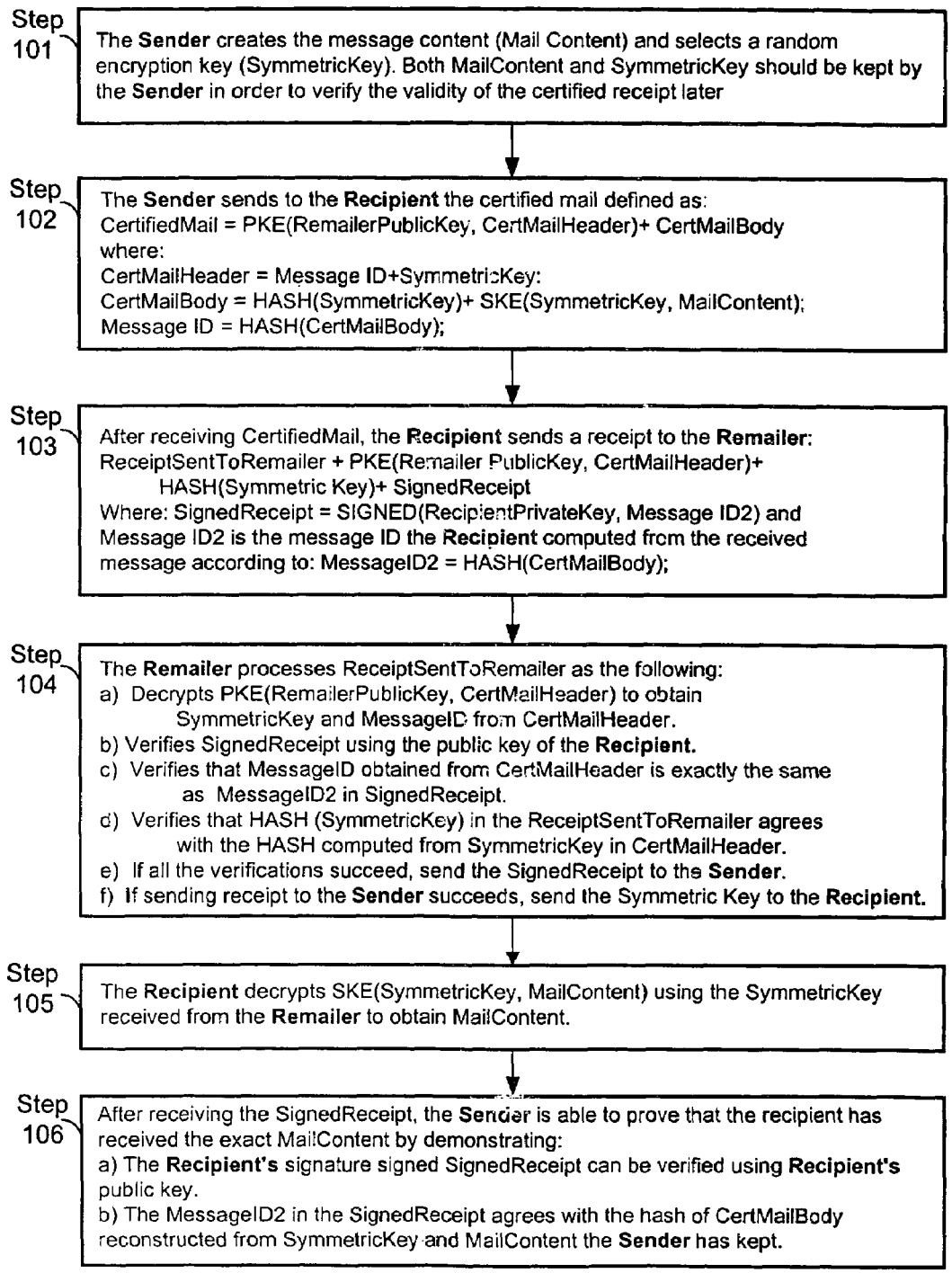
FIG. 2 is the basic process for sending and receiving certified messages using the certified messaging system shown in FIG. 1.

Referring now to FIGS. 1 and 2, the basic process for certified transmission between a Sender 1 and a Recipient 2 over a network 4 is shown. The basic process allows the Sender 1 to obtain irrefutable proof that the Recipient 2 has received the certified message and it ensures that neither party can spoof the system. More specifically, the Recipient 2 cannot spoof the system to read the certified message without giving the Sender 1 a certified receipt irrefutably tied to the certified message. The Sender 1, on the other hand, cannot spoof the system to obtain such a certified receipt without actually delivering the exact certified message content to the Recipient 2. However, for the purpose of simplicity, the basic process does not contain some elements that may be necessary in many practical applications. For example, the basic process does not contain elements that certify the time of sending and receiving, elements to ensure additional data secrecy for communications between the Sender 1, the Recipient 2, and the Remailer 3, and elements to authenticate the public keys of these parties. These additional elements and their benefits will be discussed in the enhanced process below in association with FIGS. 3, 4*a* and 4*b*. For the discussion of the basic process, we assume that the communications between the Sender 1, the Recipient 2, and the Remailer 3 has been secured and authenticated. In addition, we assume that each party already knows the public keys of the other parties. In some situations, the basic process is the best implementation. For example, if the communications between these parties are already secured by dedicated links, there may not be any need for additional security and authentication.

The basic process starts at Step 101, the Sender 1 creates the message content (MailContent) and then randomly generates an encryption key (SymmetricKey) which will be used to hide the certified message content from the Recipient 2 until a valid certified receipt is verified by the Remailer 3. In one implementation, the random encryption key is 168-bit long and can be used as a Triple-DES key.

In Step 102, the Sender 1 constructs the certified message (CertifiedMail) and sends it to the Recipient 2. The certified message consists of two parts, the certified mail header (CertMailHeader), and the certified mail body (CertMailBody). The certified mail body contains the hash of the SymmetricKey and the message content encrypted by the SymmetricKey. The certified mail header contains the SymmetricKey and the MessageID, which in one implementation is the hash of the CertMailBody. The certified mail header is encrypted by the public key of the Remailer 3. In one implementation, the message content is encrypted by the SymmetricKey using Triple-DES and the CertMailHeader is encrypted by the public key of the Remailer using a 1024-bit Rabin Public Key Encryption Algorithm. Alternatively, the CertMailHeader can be encrypted by a hybrid public key/symmetric key encryption technique, in which the Remailer's public key is used to encrypt a random session key and the random session key is used to encrypt the CertMailHeader. One example of the hash function that can be used here is MD5.

In Step 103, after receiving the CertifiedMail, the Recipient 2 signs a certified receipt and sends it to the Remailer 3 along with the encrypted CertMailHeader and the hash of the SymmetricKey. In order to produce the signed certified receipt (SignedReceipt), the Recipient 2 first computes the hash of the CertMailBody to produce MessageID2, and then signs MessageID2 using the Recipient's private key to produce the signed certified receipt. (SignedReceipt=SIGNED(RecipientPrivateKey, MessageID2)). If the message has not been tampered with, MessageID2 should be the same as MessageID computed by the Sender 1. The signed certified receipt is sent to the Remailer 3 along with the encrypted CertMailHeader and the hash of the SymmetricKey (they are obtained from the received CertifiedMail). Because MessageID2 is a small piece of data (for example, a 128-bit MD5 hash), it can be directly signed using the public key algorithm. In this case, the signed certified receipt is simply the signature produced by the public key algorithm. Alternatively, the certified receipt can be signed using conventional means. In this case, the hash of MessageID2 is first computed, then the hash is signed using the public key algorithm, and finally, the signature is attached to MessageID2 to produce the signed certified receipt.

In Step 104, when the Remailer 3 receives the data sent by the Recipient 2 in Step 103, it decrypts the encrypted CertMailHeader and verifies the validity of the SignedReceipt. The verifications include verifying the Recipient's signature that signed the SignedReceipt using the Recipient's public key, verifying that the MessageID obtained from CertMailHeader is the same as the MessageID2 in the SignedReceipt, and verifying that the hash of the SymmetricKey sent by the Recipient 2 agrees with the same hash computed from the SymmetricKey obtained from CertMailHeader. If all these verifications are successful, the Remailer 3 sends the Signed Receipt to the Sender and sends the SymmetricKey to the Recipient 2.

If any of these verifications fails, for example, if the SignedReceipt is not properly signed, or if there is any discrepancy between the data sent by the Recipient 2 and the data in the encrypted CertMailHeader, the Remailer 3 will not send the SignedReceipt to the Sender 1 nor give the SymmetricKey to the Recipient 2. This ensures that neither party can cheat the system (as will be analyzed in detail below).

In Step 105, after receiving the SymmetricKey from the Remailer 3, the Recipient 2 can use the SymmetricKey to decrypt SKE(SymmetricKey, MailContent) in CertMailBody and obtain the message content.

In Step 106, after receiving the SignedReceipt, the Sender 1 can use it to prove that the Recipient 2 has received the message content. This can be done by demonstrating: a) the SignedReceipt can be verified by the public key of the Recipient 2 and, b) the MessageID2 agrees with the hash of CertMailBody reconstructed from the SymmetricKey and MailContent kept by the Sender 1.

The process described above ensures that the Recipient 2 cannot spoof the system to read the certified mail without sending a valid certified receipt. Likewise, the Sender 1 cannot spoof the system in order to obtain a valid receipt without actually delivering the certified mail content to the Recipient 2. An additional advantage is that the Remailer 3 can be made "Stateless". In other words, the Remailer 3 does not need to handle the certified message nor store any information related to it. The Remailer 3 can process the encrypted CertMailHeader and SignedReceipt dynamically and does not have to rely on any information saved previously. This greatly simplifies the Remailer 3 design.

Recipient Spoofing Prevention

A Recipient 2 attempting to spoof the system desires to read the certified mail without signing and sending a valid receipt to the Remailer 3. Since the SymmetricKey is needed to decrypt the message content and the SymmetricKey is encrypted by the Remailer's public key (as part of the CertMailHeader), the Recipient 2 must send the encrypted CertMailHeader [PKE(RemailerPublicKey, CertMailHeader)] to the Remailer 3 to get it decrypted. However, because the Remailer 3 expects a signed receipt to be sent along with the encrypted CertMailHeader, the only way the Recipient 2 can spoof the system is to send an invalid receipt. There are only two ways to make the Receipt invalid: either the receipt is not signed properly or the receipt is properly signed but includes a wrong MessageID2. However, in Step 104, the Remailer 3 verifies the Recipient's signature on the Receipt and verifies that the MessageID2 is the same as the message ID put into the CertMailHeader by the Sender 1. If any verification fails, the SymmetricKey is not sent to the Recipient 2. For this reason, if the Recipient 2 wants to put a wrong MessageID2 into the receipt, the Recipient 2 must also change the MessageID in the encrypted CertMailHeader. Although an encrypted package is not tamper-proof in principle, anyone tampering would have very little control over the content that would result from decrypting the tampered package. It is therefore extremely difficult to tamper with the encrypted CertMailHeader in a way that, when decrypted, the SymmetricKey inside is intact but the MessageID is changed to be exactly the same wrong MessageID2 the Recipient 2 wants to put into the receipt. In one implementation, the encrypted CertMailHeader can include format information and redundancies, making this type of tampering even more difficult. Another way to prevent tampering of CertMailHeader is to sign it using the private key of the Sender 1. Signing the CertMailHeader is one of the improvements discussed in the enhanced system described with reference to FIGS. 3 and 4a and 4b.

Sender Spoofing Prevention

A Sender 1 attempting to spoof the system desires to obtain a valid receipt that can be verified according to Step 106 without actually delivering the Message Content to the Recipient 2. Since the receipt must be signed by the Recipient 2 to be valid, the Sender 1 cannot fake the receipt directly. The only thing the Sender 1 can do is to trick the Recipient 2 into signing and sending a receipt without delivering the actual Message Content. However, if the actual Message Content is not delivered and instead a rogue message is delivered, the MessageID2 computed by the Recipient 2 will not match the MessageID computed by the Sender 1 and included in CertMailHeader. It is cryptographically difficult for the Sender 1 to create two different copies of the message content that have the same MessageID.

Alternatively, the Sender 1 can attempt to trick the Recipient 2 into signing a receipt without giving the Recipient 2 the correct Symmetric Key. To do this, the Sender 1 can either send a corrupted public key encrypted CertMailHeader that cannot be decrypted or put a wrong SymmetricKey into an otherwise valid CertMailHeader. If the public key encrypted CertMailHeader is corrupted, the Remailer 3 process will fail and the Sender will not be able to obtain a receipt, even if the Recipient 2 is tricked into signing and sending a valid receipt to the Remailer 3. Alternatively, if the Sender 1 provides a correctly encrypted CertMailHeader, but puts a wrong SymmetricKey into it, again, the Remailer 3 guards against this kind of attack by ensuring that the SymmetricKey obtained from the CertMailHeader agrees with the hash of the SymmetricKey sent by the Recipient 2. The hash of the SymmetricKey sent by the Recipient 2 must be the correct copy, because it is included in the MessageID2 computation. (Otherwise, the Sender 1 will get a receipt with a wrong MessageID that cannot be verified in Step 106). Alternatively, if the symmetric key included in CertMailHeader can be matched to the HASH(SymmetricKey) in the CertMailBody, but a different symmetric key is used by the Sender 1 to encrypt the MailContent, then the Sender 1 cannot ever demonstrate that the returned SignedReceipt matches the real CertMailBody message ID, thus rendering the SignedReceipt useless.

Multiple Senders

When multiple Senders 1 exist in the system, the Remailer 3 needs to know where to send the signed receipt. In order to support this function, a Sender' address can be added to the basic process. The Sender's address (e.g. Email address or IP address) can be included in the CertMailHeader. In other words, the CertMailHeader may be redefined as CertMailHeader=SenderAddress+MessageID+SymmetricKey. The SenderAddress can be any data that uniquely identifies where to send messages for the Sender 1. For example, in a certified mail system over the Internet, the SenderAddress can be the Sender's email address. The inclusion of SenderAddress will allow the Remailer 3 to know where to send the signed receipt without using any previously stored data (so that the Remailer can remain stateless).

When multiple Senders 1 are involved, a new type of Recipient 2 spoofing may become possible. The Recipient 2 may be able to tamper with the SenderAddress so that the receipt will be sent to somewhere other than the actual Sender's address. If such a spoof is successful, the Sender 1 will not obtain a receipt but the Recipient 2 will be able to read the certified message. It is very difficult to modify the Sender 1 address since it is inside an encrypted package PKE(RemailerPublicKey, CertMailHeader). To make the tampering of the Sender 1 address even harder, the SenderAddress can be added to the CertMailBody and the SignedReceipt. The Remailer 3 can then verify that the SenderAddress in CertMailHeader is the same as the SenderAddress in the SignedReceipt. (The reason SenderAddress should be put into CertMailBody is because the Recipient needs it in order to put it into SignedReceipt. The Recipient cannot get the SenderAddress inside the encrypted CertMailHeader.) If the certified receipt contains the Sender's address, the receipt, is not only tied to the particular certified message but also tied to the specific Sender 1. Only the actual Sender 1 can use the receipt to prove that he has sent the certified message and the Recipient 2 has received it.

To summarize, in a system that has multiple Senders 1, the following additional elements can be added to the basic process shown in FIG. 2.

1) In Step 102, SenderAddress is added to both CertMailHeader and CertMailBody. CertMailHeader=SenderAddress+MessageID+SymmetricKey, and CertMailBody=SenderAddress+HASH(SymmetricKey)+SKE(SymmetricKey, MailContent)
2) In Step 103, SenderAddress is added to SignedReceipt. SignedReceipt=SIGNED(RecipientPrivateKey, SenderAddress+MessageID2)
3) In Step 104, verification step c) not only verifies that the MessageID in CertMailHeader is the same as the MessageID2 in the SignedReceipt but also verifies that the SenderAddress in CertMailHeader is the same as the one in SignedReceipt.

Multiple Recipients

When the same certified message is sent to multiple recipients, no certified messaging system can guarantee that each Recipient 2 must send back a receipt before being able to read the certified message content. The reason is that, once one Recipient 2 has opened the content (and returned a receipt), the one Recipient 2 can forward the certified message content to other Recipients 2 who will be able to read the content without sending a receipt. This is a fundamental limitation of any certified messaging system. In other words, when the same certified message is sent to a group of Recipients 2, a certified message system can only guarantee that at least one Recipient 2 must send a certified receipt before any one in the Recipient group can read the message. After this one Recipient 2 has sent the receipt, it is possible for others in the group to read the certified message without sending a certified receipt. Recognizing this fundamental limitation, two implementations, each having advantages and disadvantages, are proposed to deal with multiple recipients.

In one implementation, a different SymmetricKey can be used for each Recipient 2 in creating SKE(SymmetricKey, MailContent). In this implementation, the certified message for each Recipient 2 will have a different MessageID. Although a Recipient 2 who has not sent a receipt can obtain the content from other recipients who have sent the receipt, he may not know whether his copy of the certified message contains the same content. He may think it is a different certified message. In order to find out whether his copy of the certified message contains the same content, he must send a receipt and open his copy of the certified message. One limitation of this implementation is that the Sender 1 must keep all different SymmetricKeys for all the recipients. In addition, the MessageID2 in each receipt will be different.

In an alternative implementation, the same SymmetricKey can be used for all recipients. In this implementation, the Sender 1 only needs to keep one SymmetricKey for all the recipients. In addition, all the receipts from the different recipients will have the same MessageID. However, one limitation of this implementation is that it makes it easier for the recipients to cooperate so that when one Recipient 2 has sent a certified receipt, all other recipients will be able to read certified mail without sending a receipt. For example, the Recipient 2 who has obtained the SymmetricKey can send it to other recipients so that they can open the certified mail without sending a receipt. This might be easier than directly sending the certified mail content to other recipients if the content is a very big file.

In an environment of cooperating recipients, even if a certified message is sent to only one Recipient 2, there is still no guarantee that the Sender 1 can get a receipt from the correct Recipient 2. To see this, consider the following situation. Assuming the Sender Carol sends a certified message to Recipient Alice and wants to obtain an irrefutable proof that Alice has received the message. When Alice receives the message, without opening it, she can forward the message to Bob, who is not an intended recipient. Since the Recipient "Alice" is not identified anywhere in the CertifiedMail defined in FIG. 2, there is nothing preventing Bob from going through the Steps 103, 104, and 105 to obtain the MailContent. Then Bob can forward the MailContent to Alice. In the end, Alice has read the message and Carol has gotten a receipt, except that the receipt is signed by Bob, not the recipient (i.e., Alice) that Carol expected.

To prevent this type of spoofing, some unique identifier of the Recipient 2 (RecipientAddress) can be added to the CertMailHeader. In other words, the CertMailHeader may be redefined as:

CertMailHeader=RecipientAddress+MessageID+ SymmetricKey.

There is no need to add the RecipientAddress into the SignedReceipt, because the Recipient's signature is already a unique identification. In Step 104, the Remailer 3 can then verify that the RecipientAddress in the CertMailHeader is consistent with the Recipient 2 that signed the SignedReceipt.

Enhanced Process —Time Stamping, Authentication, and Additional Data Secrecy

In many situations, the Sender desires not only a proof that the Recipient has received a particular certified message but also a proof that the message was sent and opened at specific times. Time stamp functionality can be added to the basic process. For example, a time stamp certificate that contains a time and the hash of the message signed by a time stamping authority can be used to certify the time of sending. Another time stamp certificate that contains a time and the hash of the receipt can be used to certify the time of opening.

In the above discussions of the basic processes, we have ignored all the elements that secure the communications between the Sender 1, the Recipient 2 and the Remailer 3. We simply assumed that all the communications between these parties have been secured and authenticated. Additional elements that authenticate the messages between the Sender 1, the Recipient 2, and the Remailer 3 can be included in the process. For example, in order for the Recipient 2 to authenticate the certified message before signing and sending the receipt, the Sender 1 can sign the message before sending it to the Recipient 2. In order to prove that the Sender's signature is authentic, a certificate (e.g. X509 certificate) issued by some CA (Certificate Authority) may be attached to certify the Sender's public key. The Recipient 2 can verify the Sender's signature and the certificate to ensure that the message is authentic before signing and sending the receipt. Likewise, the Recipient 2 may attach his/her (X.509) certificate to the signed certified receipt so that the Remailer 3 and the Sender 1 can verify the authenticity of the Recipient's public key used in verifying the receipt.

Another authentication that can be added to the process is to let the Sender 1 sign the CertMailHeader before encrypting it. In the above discussions, we explained that it is very difficult to tamper with the encrypted CertMailHeader in order to obtain a specific decryption result. Signing CertMailHeader makes it even more tamper proof.

Besides data authentication, additional data secrecy may be needed. Although the MailContent is already encrypted by SymmetricKey, the SymmetricKey is accessible to the Remailer 3. In some cases, especially when the entity that handles the message transmission is the same entity that owns the Remailer 3, it may be desirable to encrypt the whole CertifiedMail using the public key of the Recipient 2 to ensure that only the Recipient 2 can obtain the message. Even if the certified receipt does not contain the certified message itself, it may contain the hash of the message, along with Sender information, Recipient information, and the time. Therefore, it may be desirable to keep the receipt encrypted along the path from the Recipient 2 to the Remailer 3 and from the Remailer 3 to the Sender 1. Using the public key of the Remailer 3 to encrypt the certified receipt when the Recipient 2 sends the receipt to the Remailer 3, and using the Sender's public key to encrypt the receipt when the Remailer 3 sends the receipt to the Sender 1, can accomplish this objective.

In many of the situations described above, the public key of each party needs to be distributed to the other parties. Various ways can be used to facilitate the distribution of the public keys to other parties. For example, each party can send its public key to other parties prior to the communication. Alternatively, each party can post its public key to a key server and the other parties can retrieve the public key from the key server prior to the communication. Some public keys, such as the Remailer's public key, can be hard coded into programs executed by the Sender 1 or Recipient 2.

Time stamping can be combined with the public key distribution and authentication. Such a method will provide additional advantages. The method and its advantages will be discussed in greater detail below.

Figure 3:
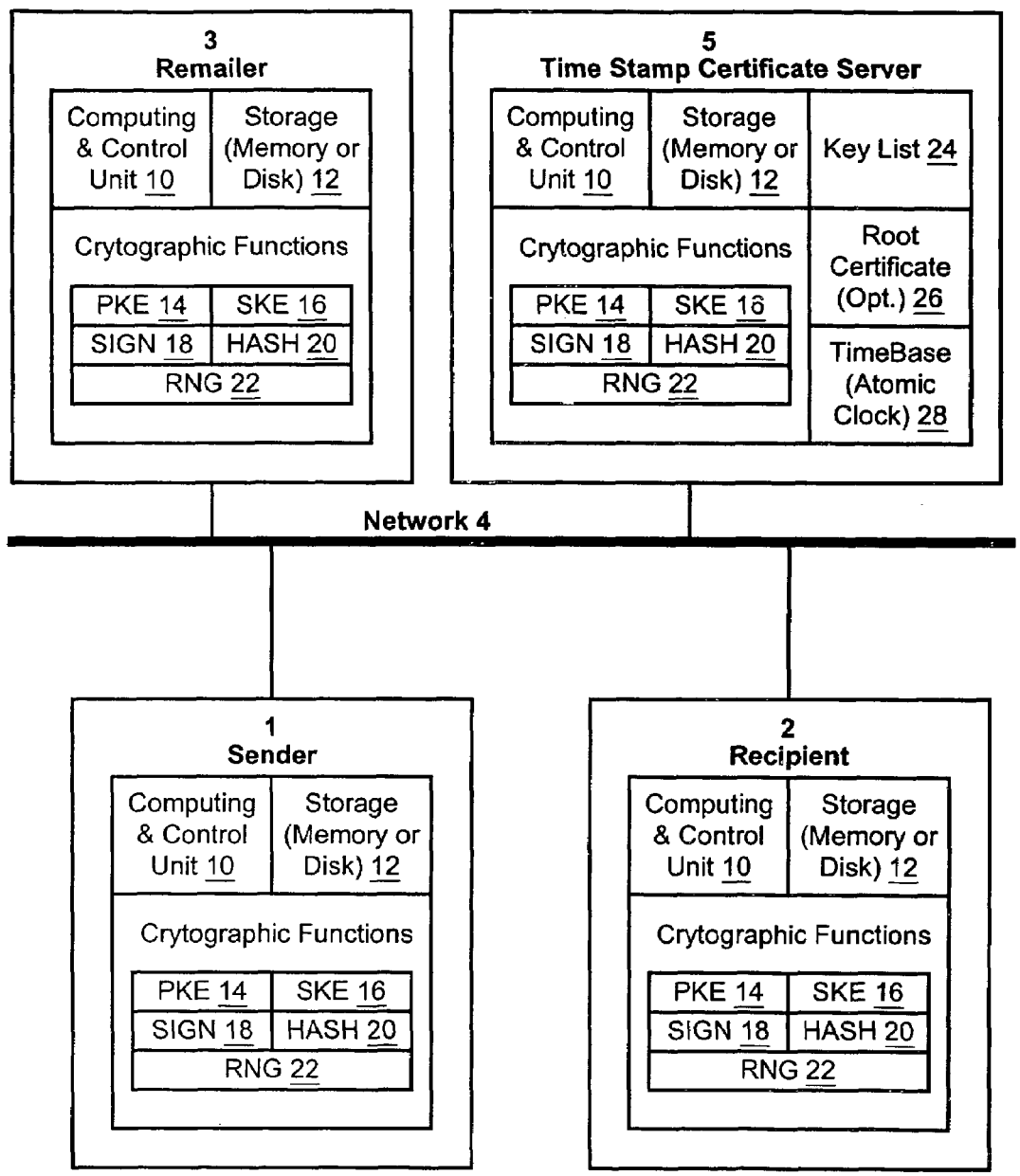
FIG. 3 is a schematic block diagram of an enhanced system that provides additional security features such as time stamping, authentication, and data secrecy for certified communications.

Referring now to FIG. 3, a certified messaging system that supports time stamping and additional data secrecy and authentication is described. In addition to the Sender 1, the Recipient 2, and the Remailer 3, the system also includes a Time Stamp Certificate Server 5 (TSC Server) coupled to the network 4.

Time Stamp Certificate Server 5 is a computing device, which, in addition to computing/control unit 10, storage 12, and cryptographic functions, also includes a time base 28, a key list 24, and a root certificate 26. The time base 28 is a clock that keeps an accurate time used for time stamping purpose. In one implementation, the time base is an atomic clock periodically synchronized with a national time standard. The key list 24 is a list that contains the public keys of all Senders 1, all Recipients 2, and the Remailer 3. The key list in one implementation can also contain the Time Stamp Server root certificates and associated public keys. The key list 24 maps the addresses and/or identities of these parties to their corresponding public keys. The root certificate 26 is a certificate issued by a higher-level certification authority or the system vendor to certify the public key of the Time Stamp Certificate Server 5. In one implementation, the root certificate 26 is signed by four root private keys and the associated root public keys are hard coded into the Sender 1, the Recipient 2, and the Remailer 3. The root certificate 26 is marked as optional. In an alternative implementation where the root certificate is not used, the public key of the Time Stamp Certificate Server 5 can be considered as the root key and is hard coded into every computing device.

An example of a Time Stamp Certificate Server 5 and the process for issuing a time stamp certificate are described in greater detail as part of the "Secure Transmission System".

Figure 4A:
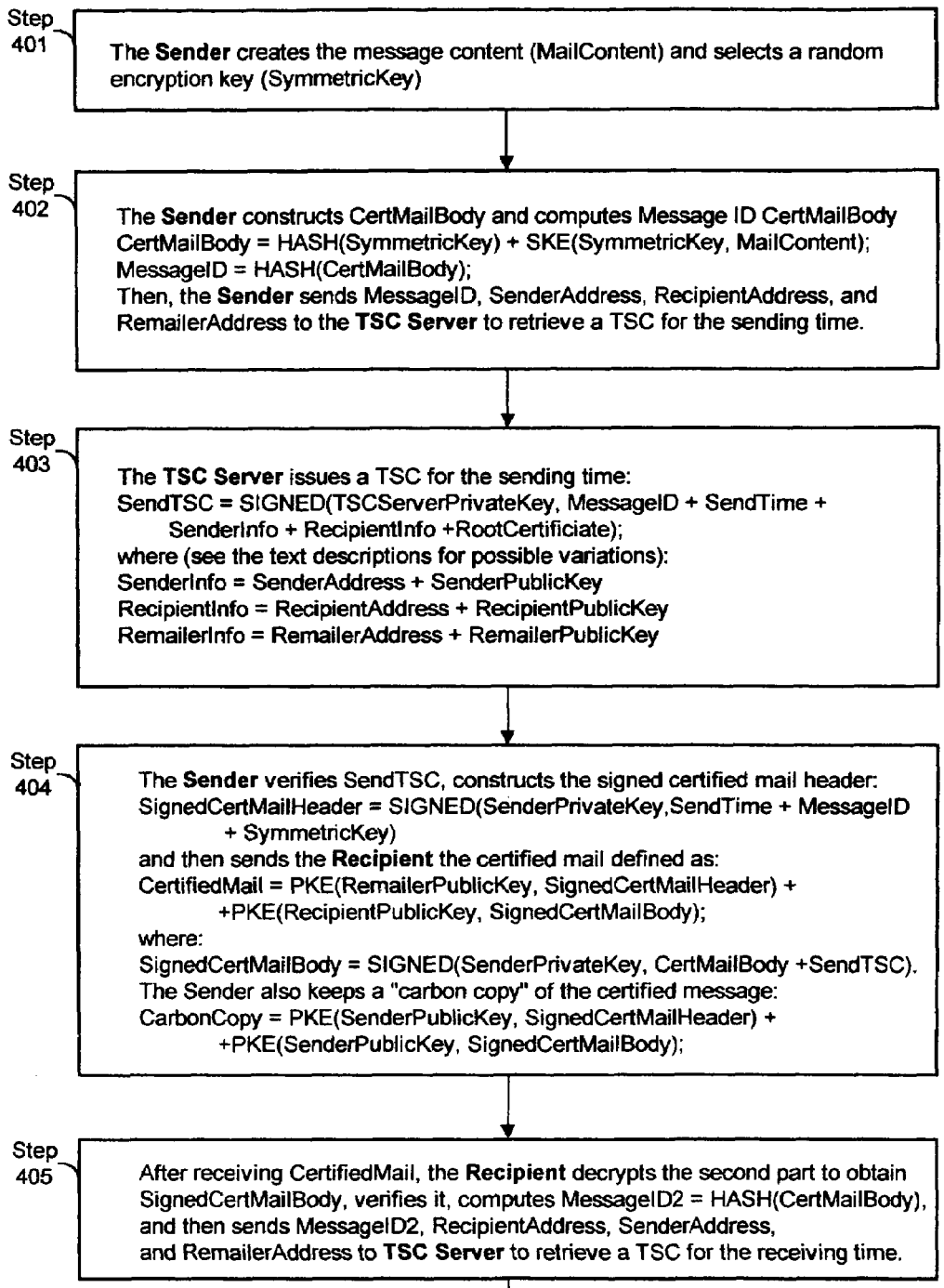
FIGS. 4a-b show a flow diagram for an enhanced process using the system shown in FIG. 3.
Figure 4B:
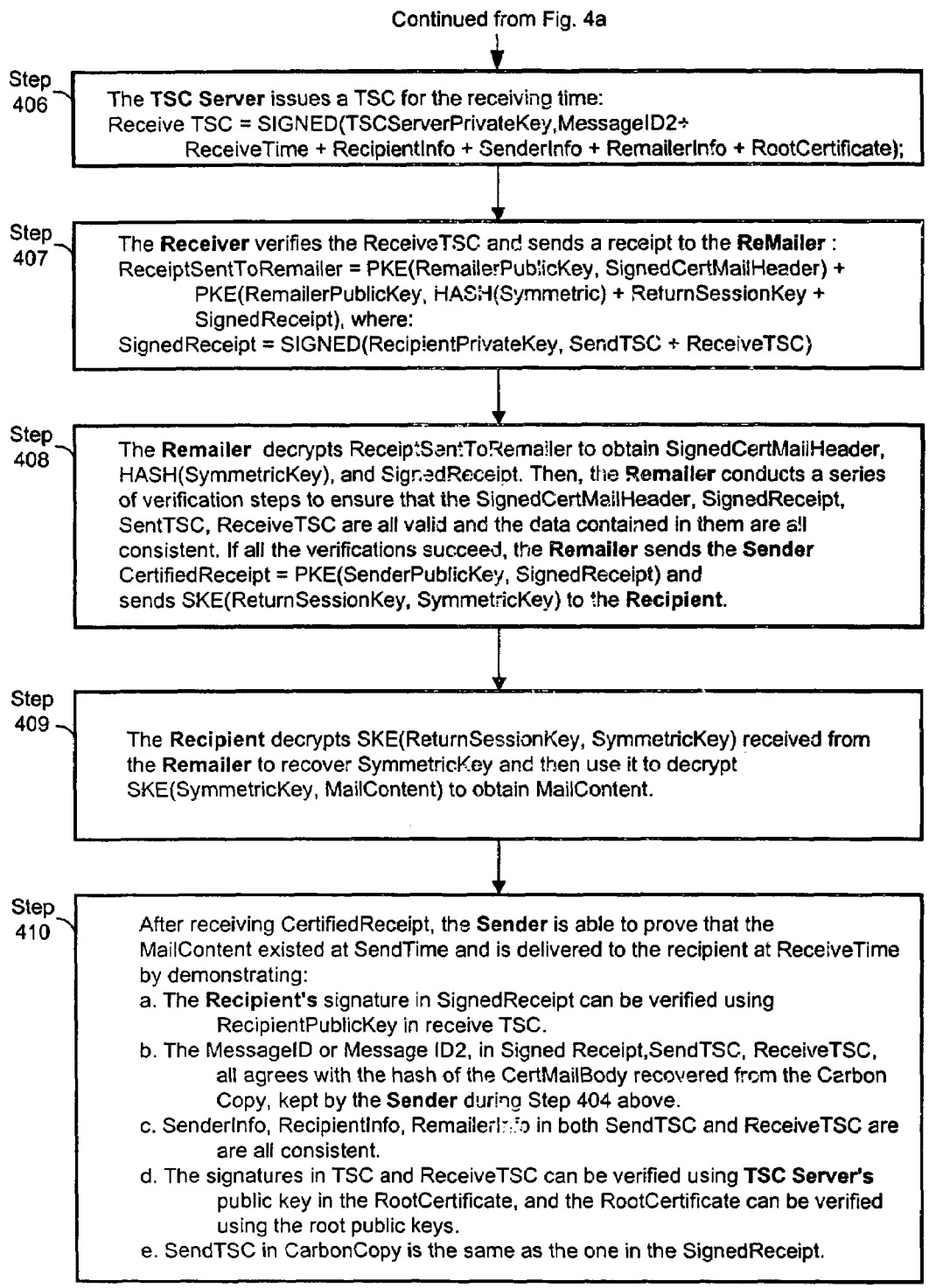

A process that supports time stamping, authentication, and additional data secrecy using the system of FIG. 3 is described with respect to FIGS. 4a and 4b.

The process starts at Step 401 of FIG. 4a, which is identical to Step 101 of FIG. 2 except the Sender 1 does not store SymmetricKey and MailContent. To achieve additional data secrecy, these data are required to be stored in encrypted form. One convenient way of storing these data will be described in Step 404.

In Step 402, the Sender 1 constructs CertMailBody and computes MessageID in the same way as in the basic process. After the CertMailBody is constructed and the MessageID computed, Sender 1 sends a request to the Time Stamp Certificate Server 5 to retrieve a TSC. In one implementation, the request contains the SenderAddress, RecipientAddress, RemailerAddress, and MessageID. If the same certified message is to be sent to multiple Recipients 2, the request may contain several RecipientAddresses. In one implementation, Sender 1 and Recipient 2 communicate through email (using SMTP), but they can communicate with the Remailer 3 through an HTTP protocol. In such case, SenderAddress and RecipientAddress are Email addresses, but the RemailerAddress may be a web address (URL). In an alternative implementation, RemailerAddress is also an Email address even if the Sender 1 and Recipient 2 communicate with the Remailer 3 through HTTP. In this case, the RemailerAddress is only used as a unique identifier for the Remailer 3, not an address actually used in communication. The advantage of such an approach is that the TSC Server 5 does not have to treat the Remailer 3 in any special way (i.e., the Remailer 3 can be treated as a conventional Recipient 2). This simplifies the design.

In Step 403, when the TSC Server 5 receives the request, the TSC server 5 finds the SenderPublicKey, RecipientPublicKey, and RemailerPublicKey in the key list corresponding to SenderAddress, RecipientAddress, and RemailerAddress. Then the TSC Server 5 obtains the SendTime from Time Base 28 and issues a TSC:

SendTSC=SIGNED(TSCServerPrivateKey, MessageID+SendTime+SenderInfo+RecipientInfo+RemailerInfo+RootCertificate);

The TSC contains MessageID, send time, sender information, recipient information, Remailer information, and the root certificate. In case the same certified message is to be sent to multiple recipients, there may be multiple recipient information data pieces included in the TSC. In one implementation, the sender information includes the Sender 1 address and the Sender's Public Key. The recipient information can include the Recipient 2 address and the Recipient's Public Key. The remailer information can include the Remailer 3 address and the Remailer's Public Key. In an alternative implementation, the SenderInfo, RecipientInfo, and RemailerInfo may not contain the actual addresses and corresponding public keys. Instead, each may contain quantities securely tied to these data, for example, the hashes of the addresses and the hashes of the corresponding public keys. The public keys can then be transmitted outside the SendTSC. The hashes in the SendTSC can be used to verify the authenticity of the public keys received outside the process. The advantage of this approach is to make the SendTSC smaller, because a hash is usually smaller (e.g. 128-bit) than a public key (e.g. 1024-2048 bit). Accordingly, sending hashed values in the SendTSC helps to minimize the size of SendTSC, particularly when the message is to be transmitted to multiple recipients. In such case, a SendTSC containing many RecipientInfos will be sent to every Recipient 2 and carried in every certified receipt. A smaller SendTSC will make the system more efficient.

The RootCertificate, issued by a higher-level certification authority (CA) or the system vendor, is used to certify the public key of the TSC Server 5. In one implementation, the RootCertificate is signed by four root keys and the four root public keys are hard coded into Sender 1, Recipient 2, and Remailer 3.

As the structure indicates, the SendTSC is not only a certificate that ties a time with a message hash, but also a certificate that ties the Sender's and Recipient's respective addresses with corresponding public keys. The SendTSC is a certificate that simultaneously certifies the time of the message and the public keys of the Sender 1 and Recipient 2. The TSC Server 5 relies on the key list to issue the TSCs. It is important to ensure that a public key is authentic before putting it into a key list. It is also important to remove a public key from the list when it is no longer valid. These tasks can be accomplished by following certification and revocation procedures commonly used by certification authorities (CAs). For the purpose of email communications, the email address is usually the only user identity information that needs to be verified by a CA. One example of an email verification and key posting/revocation procedure is described in "Secure Transmission System".

In Step 404, the Sender 1 verifies the SendTSC and then constructs the certified message (CertifiedMail) and sends it to the Recipient 2. The verification of SendTSC includes verifying the TSC Server's signature using the public key of the TSC Server 5, verifying the RootCertificate to ensure that the public key of the TSC Server 5 is authentic, and checking the consistency between the data in the SendTSC and the data sent in the request. The consistency check includes checking if the MessageID, SenderAddress, RecipientAddress, and RemailerAddress in the SendTSC are the same as these items sent in the request. If all the verifications succeed, the Sender 1 constructs the certified message and sends it to the Recipient 2. The certified message contains two parts, a certified mail header encrypted by the public key of the Remailer 3, and a certified mail body encrypted by the public key of the Recipient 2. Both the certified mail header and certified mail body are signed using the Sender's private key before encryption. The following notation describes the structure of the certified message:

CertifiedMail=PKE(RemailerPublicKey, SignedCertMailHeader)+PKE(RecipientPublicKey, SignedCertMailBody)

where

SignedCertMailHeader=SIGNED(SenderPrivateKey, SendTime+MessageID+SymmetricKey) and SignedCertMailBody=SIGNED(SenderPublicKey, CertMailBody+SendTSC).

For the purpose of validating the certified receipt later, the Sender 1 needs to keep a copy of the SymmetricKey and the MailContent. It is desirable to keep these sensitive data encrypted and only accessible to the Sender 1. One way to do this is to store a "carbon copy" of the certified message in the following form:

CarbonCopy=PKE(SenderPublicKey, SignedCertMailHeader)+PKE(SenderPublicKey, SignedCertMailBody)

Note that the carbon copy is exactly the same as the certified message except that both SignedCertMailHeader and SignedCertMailBody are encrypted by the public key of the Sender 1. The advantage of using a similar structure for the certified message and the carbon copy is that it simplifies the implementation. The routine that constructs the certified message can be used to construct the carbon copy by using the Sender's public key in place of the public keys of the Remailer 3 and the Recipient 2.

In Step 405, after receiving CertifiedMail, the Recipient 2 decrypts the second part [PKE(RecipientPublicKey, SignedCertMailBody)] to obtain SignedCertMailBody, computes MessageID2=HASH(CertMailBody), and carries out a series of verifications to ensure the authenticity of the message and the time stamp. The verification of SignedCertMailBody includes verifying the Sender's signature using the Sender's public key included in SenderInfo in SendTSC, verifying the TSC Server's signature in SendTSC using the TSC Server's public key included in the RootCertificate, and verifying the RootCertificate using the root keys. The verification of SignedCertMailBody also includes verifying that the MessageID in SendTSC agrees with MessageID2 computed from CertMailBody, and verifying that the RecipientInfo in SendTSC agrees with the Recipient's own address and public key. If all the verifications are successful, the Recipient 2 sends a request to the TSC Server to retrieve a TSC for the receiving (opening) time. The request contains MessageID2, SenderAddress, RecipientAddress, and RemailerAddress.

In Step 406, after receiving the request, the TSC Server issues a TSC for the receiving time:

ReceiveTSC=SIGNED(TSCServerPrivateKey, MessageID2+ReceiveTime+Recipientinfo+Senderinfo+RemailerInfo+RootCertificate).

The ReceiveTSC is similar to the SendTSC except it has a different time (ReceiveTime) and the SenderInfo and RecipientInfo are swapped. The reason is ReceiveTSC is intended as a TSC for sending the receipt back to the original Sender 1. Therefore, the "Sender" is the receipt sender (the original Recipient 2) and the "Recipient" is the receipt recipient (the original Sender 1). In the case where the same certified message is sent to multiple recipients, the SendTSC and the ReceiveTSC will be quite different. The SendTSC will contain several recipients. The ReceiveTSC will contain only one recipient, which is the original Sender 1. The TSC Server does not have to distinguish whether a SendTSC or a ReceiveTSC is being retrieved. It only needs to find the public keys according to the addresses sent in the request, take the MessageID from the request, get a time from the Time Base, get the RootCertificate, combine all these items together, and then sign the combination using the TSCServerPrivateKey. The same process can be used to issue both SendTSC and ReceiveTSC without distinguishing which type is being requested.

In Step 407, the Recipient 2 verifies the ReceiveTSC and sends a receipt to the Remailer 3. The verification is similar to the verification of SendTSC in Step 404, including verifying the TSC Server's signature using the public key of the TSC Server, verifying the RootCertificate to ensure the public key of the TSC Server is authentic, and checking the consistency between the data in the ReceiveTSC and the data sent in the request. If all the verifications are successful, the Recipient generates a random ReturnSessionKey and sends the following receipt to the Remailer:

ReceiptSentToRemailer=PKE(RemailerPublicKey, SignedCertMailHeader)+PKE(RemailerPublicKey, HASH(SymmetricKey)+ReturnSessionKey+SignedReceipt)

where: SignedReceipt=SIGNED(RecipientPrivateKey, SendTSC+ReceiveTSC)

The ReturnSessionKey can be used to secure later communications between the Recipient 2 and the Remailer 3. Although MessageID2 is not explicitly shown in the definition of SignedReceipt here, it is included in both SendTSC and ReceiveTSC implicitly.

In Step 408, the Remailer 3 decrypts ReceiptSentToRemailer to obtain SignedCertMailHeader, HASH(SymmetricKey), and SignedReceipt. Then, the Remailer 3 conducts a series of verification steps to ensure that the SignedCertMailHeader, SignedReceipt, SendTSC and ReceiveTSC are all valid and the data contained in them are all consistent. The verifications include verifying Sender's signature in SignedCertMailHeader using the SenderPublicKey in SendTSC or ReceiveTSC, verifying Recipient's signature in SignedReceipt using the Recipient's PublicKey in SendTSC or ReceiveTSC, verifying TSC Server's signatures in both SendTSC and ReceiveTSC, and verifying the root certificate in both SendTSC and ReceiveTSC using the four root keys. In addition, the verifications include consistency checks including checking if MessageID and MessageID2 in SignedCertMailHeader, SendTSC, and ReceiveTSC are all equal, checking if HASH(SymmtricKey) in ReceiptSentToRemailer is consistent with SymmetricKey in SignedCertMailHeader, checking if SendTime in SignedCertMailHeader is the same as the one in SendTSC, checking if SenderInfo, RecipientInfo, and RemailerInfo in SendTSC and ReceiveTSC are consistent, and checking if ReceiveTime in ReceiveTSC is later than the SendTime in SendTSC. If all the verifications and consistency checks succeed, the Remailer 3 sends the following receipt to the Sender 1:

CertifedReceipt=PKE(SenderPublicKey, SignedReceipt).

The Remailer 3 also uses the ReturnSessionKey to encrypt the Symmetric Key and sends SKE(ReturnSessionKey, SymmetricKey) to the Recipient 2. In an alternative implementation, ReturnSessionKey can be chosen to have the same length as the Symmetric Key, then SKE(ReturnSessionKey, SymmetricKey) can be replaced by a simple XOR (exclusive or) of ReturnSessionKey and SymmetricKey. This is much more efficient, and it does not reduce security because ReturnSessionKey is used only once (the idea of one-time pad). A further alternative is to use public key encryption and send PKE(RecipientPublicKey, SymmetricKey) to the Recipient 2. The advantage of this method is that ReturnSessionKey does not have to be sent to the Remailer 3 in Step 407. One limitation, however, is that public key encryption/decryption is much less efficient than symmetric key encryption/decryption or a simple XOR.

In Step 409, the Recipient 2 decrypts the data received from the Remailer 3 to recover the SymmetricKey and then use it to decrypt SKE(SymmetricKey, MailContent) to obtain MailContent. This completes the certified message delivery.

Step 410 is carried out when/if the Sender 1 needs to prove that the MailContent existed at SendTime and was delivered to the Recipient 2 at the ReceiveTime. The proof includes verifying the Recipient's signature, the messageID or messageID2, sender information, recipient information, remailer information, the signatures in the SendTSC and ReceiveTSC and the carbon copy SendTSC. The detailed verification steps are shown in FIG. 4b.

Security Analysis of the Enhanced Process

In the process described above with respect to FIGS. 4a and 4b, all communications between the Recipient 1, the Sender 2, and the Remailer 3 are encrypted by the public keys of the receiving parties or by a symmetric key (e.g., ReturnSessionKey) exchanged between the parties. This provides adequate data secrecy. In addition, all the data sent between these parties are signed by the originating parties and the signatures can be authenticated by verifying the certification chain starting from the root keys. This provides adequate data authentication. It is also clear that the process contains all the elements described in the basic process (although many new elements are added). This means, the security analysis for the basic process still applies and the enhanced process can also prevent the type of Sender 1 and Recipient 2 spoofing described in the analysis of the basic process.

One may notice that the elements to deal with multiple senders and multiple recipients are not included in SignedCertMailHeader, CertMailBody, and SignedReceipt. However, this does not mean that the enhanced process of FIGS. 4a-4b cannot prevent the type of spoofing discussed in the multiple sender/recipient cases. Although SignedCertMailHeader does not contain SenderAddress, it contains the Sender's signature, which also uniquely identifies the Sender 1. The Remailer 3 can rely on the SenderAddress in SendTSC to determine where to send the receipt, as long as it can successfully verify the Sender's signature using the SenderPublicKey in the same SendTSC. The Remailer 3 cannot be tricked into sending the receipt to anywhere else other than the actual Sender 1. Although the SenderAddress is not explicitly put into SignedReicipt, the receipt still contains SenderAddress, because it contains SendTSC. This shows that the type of spoofing discussed in the multiple sender case can be prevented. Although SenderAddress is not in CertMailBody, the Recipient 2 can still get it from the SendTSC.

Although RecipientAddress is not in SignedCertMailHeader, the type of spoofing discussed in multiple recipient cases can still be prevented. Reconsidering such spoofing under the enhanced process, if Bob signs the receipt, the signature will be inconsistent with the RecipientInfo in SendTSC. Even if Bob can retrieve a new SendTSC with himself as the recipient and Carol as the sender, it will not have the same time as the SendTime in SignedCertMailHeader. In either case, the Remailer 3 will be able to detect such spoofing and refuse to give Bob the SymmetricKey required to read the message. This means the type of spoofing discussed in the multiple recipient case can be prevented.

With the added time stamping functions, the security of the time stamp needs to be analyzed. Since SendTSC is used to prove that the message content existed at the SendTime, there is no way for the Sender 1 to obtain a false proof. If the message content does not exist yet, the Sender 1 cannot get the correct MessageID to send to Time Stamp Server 5 in order to have the Message ID put into SendTSC. Since the Recipient 2 must first retrieve ReceiveTSC and send the receipt before being able to get the message content, the Recipient 2 cannot claim that the certified message is received at some later time. Therefore, the ReceiveTSC inside the signed receipt is a proof that the Recipient 2 has received the certified message no later than ReceiveTime. If the Recipient 2 wants to read the certified message, he has no way to avoid sending such a proof to the Sender 1. However, there is still one type of spoofing the Recipient 2 might be able to do. After receiving the certified message, the Recipient 2 can use the MessageID computed from the message to retrieve another TSC pretending to be the Sender 1. Then the Recipient 2 can replace the SendTSC in the certified message with the fake one and proceed with the normal receiving process. If such a spoofing is successful, the Recipient 2 will be able to read the certified message but the Sender 1 will get a receipt that is otherwise valid except containing a SendTime later than the time the certified message was actually sent. In this case, the SendTSC in the receipt will not match the one in the CarbonCopy. This type of spoofing is prevented, because the SendTime is in the SignedCertMailHeader. This allows the Remailer 3 to verify that the SendTime in SignedCertMailHeader is the same as the time in SendTSC (in Step 408). If not, the Remailer 3 will not send the receipt to the Sender 1 nor return SymmetricKey to the Recipient 2. This also means the Sender 1 cannot spoof the system to his advantage by putting a wrong SendTime into SignedCertMailHeader.

The advantages of the combined time stamping and public key authentication are clear from the above discussions of the enhanced process. The combined structure offers more than the sum of the elements when each element is used independently. For example, when the time stamping and the public key certification are combined into one certificate, the certificate not only certifies the time of the message and certifies the public keys, but also certifies that the public keys are valid at the exact time the message is sent. The certificate also becomes a one-time use, real time certificate that can only be used for only one particular message. This eliminates the need for a certificate revocation list (CRL). In the traditional PKI, when a user's private key is compromised, even if the corresponding certificate is put into the CRL and distributed to every other user, there is still a problem of how to deal with a document that appears to be signed before the key was compromised. A real time certificate tied to a particular message completely solves this problem. This has important implications for certified messaging systems, because even if the recipient's key is compromised, the proof for all the certified communications that happened before the key is compromised is still irrefutable. Anything short of this allows an easy way for the Recipient 2 to deny receiving a certified message. He can simply publicize his private key and refute any receipt he has signed. Even if the receipt appears to be signed before the key is publicized, he can always claim that the receipt has been backdated and signed by someone else after the publication. The real-time certificate described in this invention will defeat such a strategy of denial.

Unlike the traditional PKI and time stamping, which uses separate certificates to certify the Sender 1, the Recipient 2, and the time, the TSC Server 5 described above certifies all these items with one certificate. Such a certificate not only certifies the Sender 1, Recipient 2, and time, but also certifies the association between them. The certification of such an association plays an important roll in preventing spoofing in the multiple recipient case discussed above. If SendTSC were replaced by three separate traditional certificates for the Sender 1, the Recipient 2, and the time, then Bob could keep the certificates for the Sender 1 and the time intact, but replace the recipient certificate with his own certificate. In such case, the spoofing would succeed. After Alice decrypted the certified message and forwarded it to Bob, Bob could replace the recipient certificate with his own certificate to make the certified message appear to be sent to him. The Remailer 3 would then allow Bob to send a receipt and obtain the SymmetricKey to decrypt the message content. Bob could then send the message content to Alice. At the end, Alice would be able to read the message but the Sender Carol would get a receipt signed by a wrong person. In general, by combining several certificates into one, the possibility of spoofing based on swapping, replacing, and permuting the certificates is greatly reduced. Another advantage is that the certificate needs only to be signed and verified once, not several times. This increases the overall system efficiency in many situations.

While this invention has been described in terms of several preferred implementations, it is contemplated that alterations, modifications and permutations thereof will become apparent to those skilled in the art upon a reading of the specification and study of the drawings.

For example, the certified message can have a subject title (Subject). The Subject can be included in the SignedReceipt and in the CarbonCopy so that the Sender can readily determine which SignedReceipt corresponds to which CarbonCopy. To prevent the Recipient 2 from causing nuisance to the Sender 1 by changing the Subject in the receipt, the Subject can be put into the SignedCertMailHeader so that the Remailer 3 can catch such spoofing. In addition, Remailer 3 functionality can be located in the TSC Server 5 so that some common elements such as the cryptographic functions do not have to be duplicated in two places. While the improved process described above uses encryption and strong authentication for every communication between Sender 1, Recipient 2, and Remailer 3, some of these security measures may be redundant or overkill in some situations. In these situations, it will become apparent to those skilled in the art, upon a reading of the specification and study of the drawings, that some elements may be changed or eliminated. For example, the RootCertificate may not be necessary if the public keys of the TSC Server 5 are hard coded or otherwise made known to all the parties.

Furthermore, certain terminology has been used for the purposes of descriptive clarity, and should not be construed to limit the invention. It is therefore intended that the following appended claims include all such alterations, modifications and permutations as fall within the true spirit and scope of the present invention.

What is claimed is:

1. A computer-implemented method, comprising:
   encrypting a message using a symmetric key to generate an encrypted message;
   sending the encrypted message to an intended recipient without making the symmetric key immediately accessible to the intended recipient;
   providing the symmetric key to a third party; and
   if the intended recipient signs and returns to the third party a receipt including a representation of the encrypted message, transferring, by the third party, the receipt to a sender and providing the symmetric key to the intended recipient.

2. The computer-implemented method of claim 1 wherein the receipt signed by the intended recipient contains an identifier computed from the message and the symmetric key using a cryptographically secure hash function.

3. The computer-implemented method of claim 1, further comprising:
   storing a copy of the receipt and the symmetric key; and
   verifying the validity of the receipt using the stored symmetric key and the message.

4. The computer-implemented method of claim 1, further comprising:
   computing a hash of the symmetric key; and
   making the hash of the symmetric key accessible to the intended recipient, wherein the receipt contains a representation of the symmetric key.

5. The computer-implemented method of claim 1, wherein:
   sending the encrypted message to the intended recipient includes encrypting the symmetric key with a public key of the third party and sending the encrypted symmetric key to the intended recipient so that the recipient cannot access the symmetric key or the message prior to the intended recipient returning the signed receipt to the third party; and
   encrypting a message using a symmetric key to generate an encrypted message includes creating a first hash of encrypted content of the message and including the first hash of the encrypted content in the encrypted message.

6. The computer-implemented method of claim 1, further comprising:
   decrypting the encrypted symmetric key for providing to the intended recipient.

7. The computer-implemented method of claim 6, wherein:
   decrypting the encrypted symmetric key includes decrypting the encrypted symmetric key received from the intended recipient, wherein the intended recipient received the encrypted symmetric key from the sender.

8. The computer-implemented method of claim 1, further comprising verifying the receipt by the third party, wherein:
   providing the symmetric key to the intended recipient occurs after verifying the signed receipt.

9. The computer-implemented method of claim 1, wherein:
   providing the encrypted symmetric key to the third party without exposing the message to the third party.

10. A computer-implemented method, comprising:
    at a sender, encrypting a message using a symmetric key, encrypting the symmetric key to make the symmetric key accessible to a third party but not immediately accessible to an intended recipient and sending the encrypted message and the encrypted symmetric key to the intended recipient;
    at the intended recipient, signing a receipt including a representation of the encrypted message and sending the receipt and the encrypted symmetric key to the third party; and
    at the third party, transferring the receipt to the sender and providing the symmetric key to the intended recipient if the receipt is properly signed.

11. The computer-implemented method of claim 10, further comprising:
    at the sender, creating a first hash of encrypted content of the message and sending the first hash to the recipient;
    at the recipient, creating a second hash of the encrypted content in the message, sending the second hash to the third party and decrypting the encrypted message after receiving the symmetric key from the third party; and
    at the third party, comparing the first hash to the second hash to verify that the first hash is equal to the second hash, decrypting the encrypted symmetric key, wherein providing the symmetric key does not occur until after comparing the first and second hashes.

12. The computer-implemented method of claim 10, further comprising verifying the signed receipt by the third party, wherein:

verifying the signed receipt includes determining that a hash of the encrypted message created by the sender is equivalent to a hash of the encrypted message created by the intended recipient.

13. The computer-implemented method of claim 10, wherein:
verifying the signed receipt ensures that the intended recipient received an encrypted message sent by the sender.

14. A computer-implemented method for certifying receipt of a message, the message being sent from a sender to an intended recipient and being encrypted by a symmetric key, the method executing at a third party distinct from the sender and the intended recipient, the method comprising:
receiving a separately encrypted message header associated with the message and a certified receipt originating from the intended recipient, the certified receipt including a first message identifier signed by the intended recipient;
decrypting the separately encrypted message header to expose a symmetric key and a second message identifier;
verifying the certified receipt, including verifying a signature of the intended recipient and that the first and second message identifiers are the equivalent; and
after verifying the certified receipt, forwarding the certified receipt to the sender; and forwarding the symmetric key to the intended recipient.

15. The computer-implemented method of claim 14, wherein the message identifier includes a hash of the encrypted message, the method further comprising:
verifying that the message identifier signed by the intended recipient equals the message identifier in the separately encrypted message header.

16. The computer-implemented method of claim 14, wherein:
forwarding the symmetric key to the intended recipient occurs after verifying the certified receipt.

17. A computer-implemented method, comprising:
creating a message header that includes a symmetric key and a message identifier associated with a message for transmission to an intended recipient;
encrypting the message using the symmetric key;
public key encrypting the message header using a public key of a third party;
attaching the message header to the encrypted message forming a certified message and forwarding the certified message to the intended recipient;
receiving a certified receipt originating from the intended recipient, the certified receipt being verified at the third party and forwarded to a sender after verification; and
verifying validity of the receipt using the stored symmetric key and the certified message.

18. The computer-implemented method of claim 17, wherein the method does not include sending the message to the third party.

19. A computer-implemented method for providing a receipt for a message, the message being sent from a sender to an intended recipient and the method executing at the recipient, the method comprising:
receiving an encrypted message from a sender, the encrypted message encrypted by a symmetric key;
creating a signed receipt for the encrypted message including signing a hash of the encrypted message and returning the signed receipt to a third party;
after verification of the signed receipt at the third party, receiving the symmetric key from the third party; and
decrypting the encrypted message using the symmetric key.

20. The computer-implemented method of claim 19 wherein the step of receiving the symmetric key includes not receiving the symmetric key until a successful transfer of the signed receipt to the sender.

21. The computer-implemented method of claim 19, further comprising:
receiving a first hash of the encrypted message from the sender;
hashing the encrypted message to create a second hash of the encrypted message; and
sending the first and second hashes to the third party for the third party to verify that the first hash equals the second hash.

22. A computer-implemented method for generating a receipt associated with a message, where the receipt is created without exposing content of the message to an intended recipient, comprising:
receiving the message encrypted by a symmetric key;
receiving a hash of the symmetric key; and
generating a receipt including generating a message identifier prior to decrypting the message, the message identifier including a representation of the hash of the symmetric key and the message encrypted by the symmetric key,
wherein the message identifier is able to be used to verify receipt of the message at the intended recipient without exposing the message content to an intended recipient.

23. The computer-implemented method of claim 22, wherein:
generating a receipt including includes using a hash function to generate the message identifier.

24. The computer-implemented method of claim 22, further comprising:
receiving a first message identifier at the intended recipient;
the generating step including generating a receipt including a second message identifier, at the intended recipient; and
sending the receipt and the first message identifier to a third party.

25. The computer-implemented method of claim 24, further comprising:
receiving the receipt, at the third party;
verifying the receipt without accessing message content; and
providing the receipt to a sender.

26. The computer-implemented method of claim 22, where:
the message is encrypted with the symmetric key prior to sending to the intended recipient; and
the symmetric key is sent to the intended recipient from a third party so that the intended recipient can decrypt the message.

27. The computer-implemented method of claim 22, further comprising:
sending the encrypted symmetric key to the intended recipient with the message;
at the intended recipient, sending the encrypted symmetric key to a third party with a receipt that includes a representation of the message identifier; and
sending the receipt to a sender after verification of the receipt.

28. A computer-implemented method for generating a signed receipt associated with a message without exposing content of the message, comprising:

receiving a message encrypted by a symmetric key;
receiving a hash of the symmetric key;
generating a representation of the hash of the symmetric key and the message encrypted by the symmetric key; and
signing the representation to generate a signed receipt, wherein the signed receipt is generated prior to decrypting the message and receiving the symmetric key.

29. The computer-implemented method of claim 28, further comprising:
sending the signed receipt to a third party for transfer to a sender; and
verifying validity of the signed receipt at the third party.

30. The computer-implemented method of claim 29, further comprising:
allowing a recipient access to content of the message if the signed receipt is verified at the third party.

31. The computer-implemented method of claim 28, further comprising:
receiving a first hash of encrypted content;
hashing the received encrypted message content to create a second hash of the encrypted content; and
sending the first and second hashes to a third party for verification.

32. A computer-implemented method for time-stamping a message without exposing content of the message to a time stamping authority, comprising:
encrypting a message using a symmetric key;
computing a hash of the symmetric key;
generating a representation of the hash of the symmetric key and the message encrypted by the symmetric key; and
time-stamping the representation, including sending the representation to a time-stamping authority and receiving from the time-stamping authority a time stamp certificate including the representation, a time, and a sender identification and a recipient identification for the message.

33. A computer-implemented method for time-stamping a message without exposing content of the message to a time stamping authority, comprising:
encrypting a message using a symmetric key;
computing a hash of the symmetric key;
generating a representation of the hash of the symmetric key and the message encrypted by the symmetric key; and
time-stamping the representation, including sending the representation to a time-stamping authority and receiving from the time-stamping authority a time stamp certificate including the representation, a time, a sender identification and a recipient identification for the message and at least one of a public key of the sender and a public key of the recipient.

34. A computer-implemented method for generating a signed receipt certifying that a message has been received at a particular time by an intended recipient, without exposing content of the message, comprising:
receiving a message having content, wherein the message is encrypted by a symmetric key;
receiving a hash of the symmetric key;
generating a representation of the hash of the symmetric key and the message encrypted by the symmetric key, wherein the representation is generated prior to decrypting the message and receiving the symmetric key; and
time-stamping the representation, including sending a time stamp certificate including the representation, a time, and a sender identification and a recipient identification for the message.

35. The computer-implemented method of claim 34, further comprising:
sending the time-stamped representation to a third party such that the time stamp can be verified by the third party without exposing the content of the message to the third party; and
verifying validity of the signed receipt at the third party.

36. The computer-implemented method of claim 35, further comprising:
allowing an intended recipient access to the content of the message if the signed receipt is verified at the third party.

37. A computer-implemented method for generating a signed receipt for a message certifying a sending time and a receiving time by an intended recipient without exposing content of the message, comprising:
receiving a message encrypted with a symmetric key;
receiving a hash of the symmetric key;
receiving a time stamp certificate including a representation of the hash of the symmetric key and the encrypted message, a time, and a sender identification and a recipient identification for the message, the time stamp certificate being time-stamped at time of sending;
time-stamping the representation at a time of receiving;
combining the representation time-stamped at the time of sending and the representation time-stamped at the time of receiving to provide a combined, receipt;
signing the combined receipt; and
sending the combined receipt to a third party such that the combined receipt can be verified by the third party without exposing content of the message to the third party.

38. The computer-implemented method of claim 37, further comprising:
verifying validity of the signed receipt at the third party.

39. The computer-implemented method of claim 37, further comprising:
allowing an intended recipient access to the content of the message if the signed receipt is verified at the third party.

40. A computer-implemented method for securely sending a message, comprising:
encrypting a message using a symmetric key;
computing a hash of the symmetric key; and
generating a representation of the hash of the symmetric key and the encrypted message; sending a request including the representation to a time stamping authority;
receiving from the time stamping authority a time stamp certificate including a time stamped representation of the hash of the symmetric key and the message encrypted by the symmetric key;
generating a certified message including the time stamp certificate; and
sending the certified message to a recipient.

41. The computer-implemented method of claim 40, wherein: generating the representation includes using a one-way hash.

42. The computer-implemented method of claim 40, further comprising:
sending the representation of the hash of the symmetric key and the encrypted message to an intended recipient, wherein the intended recipient does not have access to the symmetric key for decrypting the encrypted message at the time of receipt.

43. A computer-implemented method of for securely sending and receiving a message, using a third party to verify authenticity of the message, comprising:

at a sender:
- encrypting a message using a symmetric key to generate an encrypted message;
- sending the encrypted message to an intended recipient without making the symmetric key immediately accessible to the intended recipient; and
- providing the symmetric key to a third party;

at the intended recipient:
- receiving the encrypted message from the sender;
- creating a signed receipt for the encrypted message, including signing a hash of the encrypted message and returning the signed receipt to the third party;
- after verification of the signed receipt at the third party, receiving the symmetric key from the third party; and
- decrypting the encrypted message using the symmetric key;

at the third party:
- receiving the signed receipt from the recipient;
- verifying the signed receipt;
- transferring the verified receipt to the sender; and
- providing the symmetric key to the intended recipient.

44. The computer implemented method of claim 43, wherein:

at the sender:
- sending the encrypted message to the intended recipient includes encrypting the symmetric key with a public key of the third party and sending the encrypted symmetric key to the intended recipient so that the intended recipient cannot access the symmetric key or the message prior to the intended recipient returning the signed receipt to the third party; and
- encrypting the message using a symmetric key to generate the encrypted message includes creating a first hash of encrypted content of the message and including the first hash of the encrypted content in the encrypted message;

at the intended recipient:
- returning the signed receipt to the third party includes creating a second hash of the encrypted content in the message, sending the second hash of the encrypted content in the message, forwarding the encrypted symmetric key to the third party for the third party to decrypt the key, but not sending the encrypted message to the third party;

at the third party:
- providing the symmetric key to the intended recipient after verifying the signed receipt from the intended recipient;
- verifying the signed receipt includes verifying that the first hash of the encrypted content equals the second hash of the encrypted content; and
- providing the symmetric key to the intended recipient includes decrypting the encrypted symmetric key sent by the recipient.

* * * * *